INVENTORS.
Hamilton W. Marshall, JR.
Charles C. Helms
BY
Daniel D. Levenson
ATTORNEY.

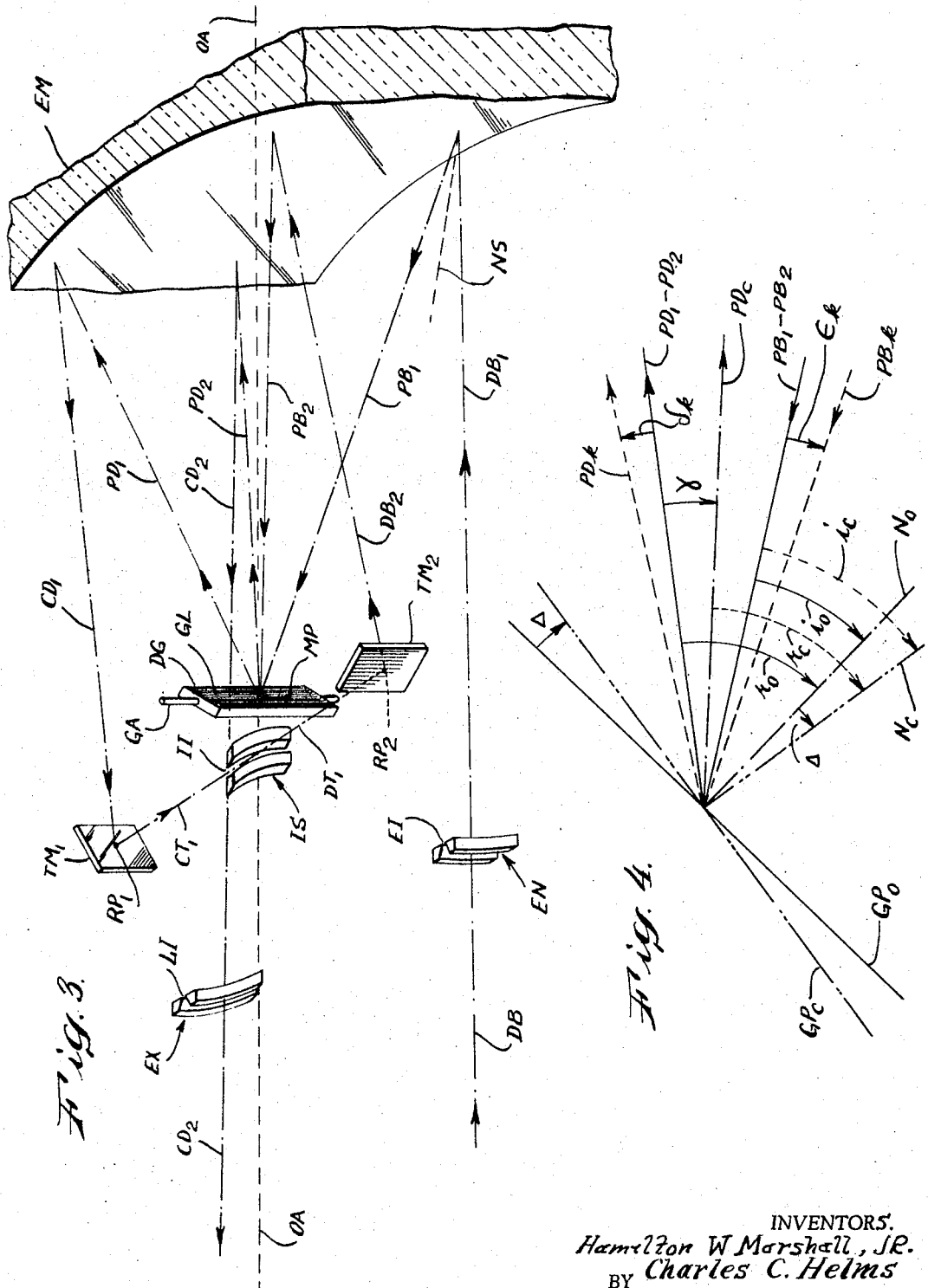

United States Patent Office 3,454,339
Patented July 8, 1969

3,454,339
DOUBLE-PASS GRATING MONOCHROMATOR WITH INTERMEDIATE SLIT
Hamilton W. Marshall, Jr., Wilton, and Charles C. Helms, Trumbull, Conn., assignors to The Perkin-Elmer Corporation, Norwalk, Conn., a corporation of New York
Filed May 27, 1966, Ser. No. 553,567
Int. Cl. G01j 3/18
U.S. Cl. 356—100                 1 Claim

ABSTRACT OF THE DISCLOSURE

Errors in the spacing of the lines of a monochromator grating cause "ghosts," in addition to the true narrow spectral band, to be formed in the exit slit of the monochromator. In double-pass monochromators of the grating type (in which the radiation is dispersed twice by the same grating) such ghosts may arise in each pass, thereby adding additional problems. The invention utilizes an additional intermediary slit positioned in the image plane of the radiation between passes to the grating. Proper selection of the slit width will eliminate ghosts arising in both the first and second pass.

---

This invention relates to the elimination of spurious spectral lines or bands occurring in monochromators utilizing a diffraction grating as a dispersive element.

In diffraction grating monochromators, systematic errors in the spacing of the grating lines will cause the spectra formed to contain additional undesired spectral images or lines at positions not readily accounted for by the theoretical grating equations. Of these "ghosts" caused by a periodic error in the grating (usually attributable to a mechanical defect of the driving mechanism of the ruling engine), the more common type is known as "Rowland ghosts." These are caused by an imperfection in the ruling engine causing a single relatively long error cycle (i.e., there are a large number of grating lines between corresponding parts of the error cycle). Such Rowland ghosts appear in the final dispersed spectrum (if the radiation is made up of discrete spectral lines) as pairs of spurious additional spectral line images symmetrically arranged about the "true" spectral line image, the first pair of such ghosts being generally quite close on each side of the true line. Although this relatively close symmetrical relationship assists the human spectroscopist in recognizing these ghosts for what they are, Rowland ghosts may be particularly troublesome in spectrometers that use photoelectric detectors, since the detector will "see" the ghosts as if they were true characteristics of the source and/or sample at a wavelength slightly removed from the true one. If any of these Rowland ghost lines more or less corresponds in position to another true spectral line, even a skilled spectroscopist may have difficulty in recognizing the spurious nature of the ghost.

Another type of spurious spectral line image is caused by more often recurring grating errors (i.e., the errors in grating spacing which recur at a cycle including only a very few grating lines), or else caused by errors of two different cycles (each of which may contain a relatively large number of grating lines) which create a relatively short period "beat" difference frequency (this beat frequency again corresponding to a relatively short cycle of only a few grating lines). Although the defects causing these so-called "Lyman" ghosts occur less frequently than those causing Rowland ghosts, Lyman ghosts are particularly difficult to interpret correctly since they may occur quite far from the corresponding true spectral line image. For this reason Lyman ghosts may be mistaken for real spectral lines, not only in photoelectric recording spectrometers but even in photographic spectrographs by skilled interpreters.

The problem of ghosts (and in particular the near Rowland ghosts) becomes aggravated in those instruments in which either a plurality of dispersive elements are used in succession or the radiation to be dispersed is repeatedly dispersed by the same dispersive element (i.e., multipass monochromators). It has been found that in, for example, a double-pass grating monochromator, not only can the Rowland ghosts originating from the first pass be carried over (and repositioned) by the second dispersion pass, but the number of Rowland ghosts is in general increased by the second (and each additional) pass. Thus in a double-pass monochromator not only will the first pass ghosts survive the second pass, but there will be second-pass ghosts of the first-pass ghosts, unless the improvements herein taught are utilized.

Stated in general terms, the invention comprises the use of an additional intermediate limiting aperture or slit (besides the conventional entrance and exit slits) positioned at an intermediate spectral image formed between passes through the grating monochromator. By proper choice of the width of this intermediate slit (as hereinafter more fully described), one may eliminate not only the ghosts resulting from the previous pass through the monochromator (and therefore prevent any of these first-pass ghosts from ultimately reaching the final exit slit), but also radiation of undesired wavelength (adjacent to but different from that for which the grating angle is set), which would cause generation of ghosts during the second pass which are directed toward the final exit slit. Thus both first-pass and second-pass ghosts may be eliminated by a single intermediate slit.

An object of the invention is therefore the elimination in a multipass grating monochromator of substantially all ghosts, arising in either the first or second passes through the monochromator, which might otherwise reach the opening in the final exit slit.

Another object of the invention is the elimination of substantially all of the most troublesome spurious images or ghosts in a grating monochromator, including especially those Rowland ghosts which occur nearest to the true final spectral line image, as well as substantially all of any Lyman ghosts.

Other objects, advantages and features of the invention will be obvious to one skilled in the art upon reading the following specification in conjunction with the accompanying drawings, in which.

Figure 1:
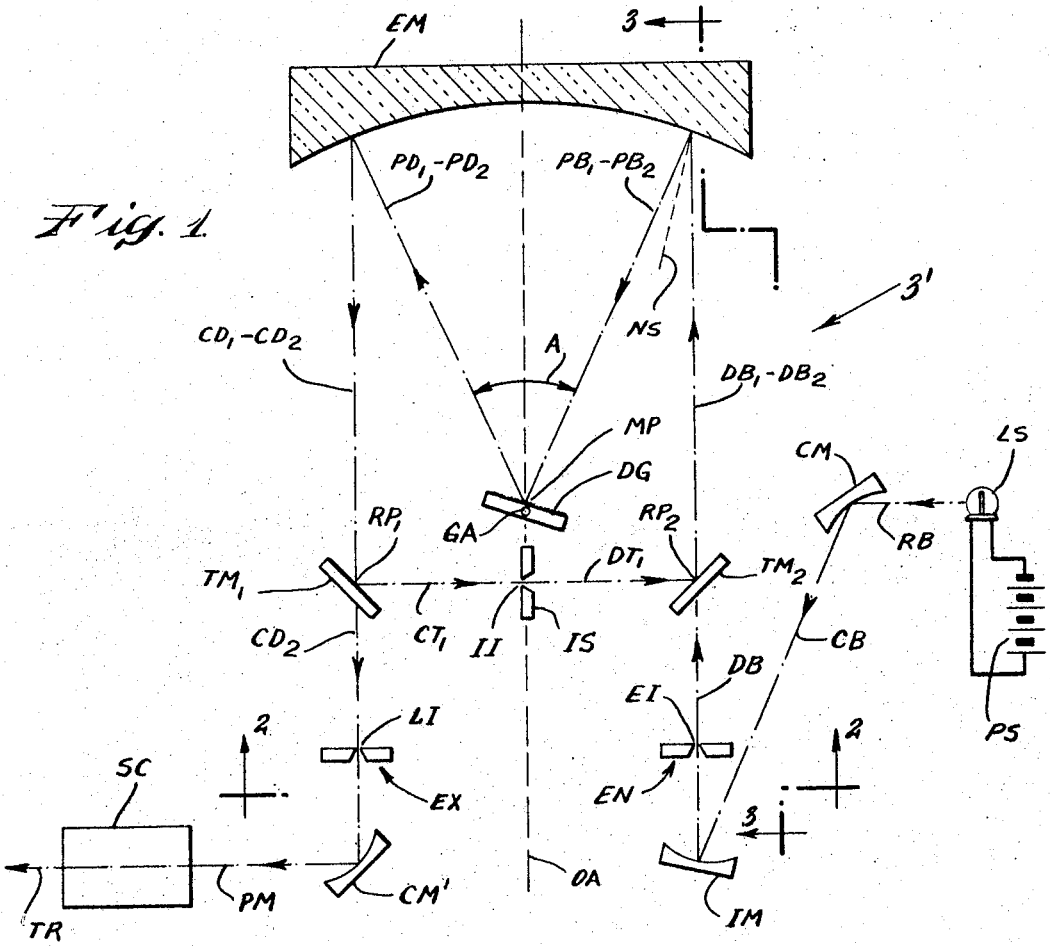
FIG. 1 is a somewhat schematic plan view of an exemplary multipass grating monochromator (of the Ebert type), incorporating the inventive intermediate slit at the spectral image formed between passes.

FIG. 3 is a side perspective view, looking generally from the right in FIG. 1, but taken from somewhat above the paper plane in FIG. 1 and looking slightly from the back to front (upper to lower part of FIG. 1) of the apparatus, as indicated by directional arrow 3' in FIG. 1; and FIG. 4 is a diagrammatic enlarged plan view of the grating, illustrating how various rays will be diffracted at two different angular positions of the grating about its axis.

Before explaining in detail what the invention is and how it works, a typical environment for the invention will be first described. This exemplary environment is a double pass grating monochromator of the Ebert type, as will be apparent hereinafter. The invention is not limited to any particular type of grating monochromator, or even solely to a double pass instrument (it being applicable to a multipass grating monochromator of any design having any number of successive dispersions). To better distinguish between what is well known prior art and what is involved in the invention, all conventional elements are first described. Thus the conventional elements of the Ebert monochromator, best seen in FIG. 1, include a light source LS (illustrated for exemplary purposes as a filament lamp), which is energized by an electrical power supply PS (schematically illustrated as a battery). The radiant beam RB emitted by the light source is collimated by mirror CM, so as to form a collimated beam CB. To avoid confusion of illustration, all the various beams are represented by their central ray, the optical characteristics of these beams being both well known and indicated by this description. In general the various optical elements (such as collimating mirror CM) will be "filled" with radiation. Thus in actuality the radiant beam RB from the light souce is diverging, and therefore various rays will strike all parts of the reflecting concave surface of the collimating mirror CM. For this reason the collimated beam CB will consist of a bundle of rays parallel to the indicated central ray on both sides thereof. This parallel beam will strike a second concave imaging mirror at IM which will converge the parallel beam to an image EI of the light source at the entrance slit EN of the monochromator. The converging rays forming the entrance image EI will cross so as to form a diverging beam DB.

As will be explained in more detail hereinafter, the particular entrance slit EN utilized is positioned solely below (i.e., into the plane of the paper in FIG. 1) the optical axis of the monochromator. Because of this fact and because the tilted mirror $TM_2$ (later to be described in more detail) is above the optical axis, this diverging beam will pass under (i.e., below the plane of the paper in FIG. 1) the canted plane mirror $TM_2$. The continuation of this diverging beam (now referenced $DB_1$) will strike the right-hand side of the concave front reflecting surface of an Ebert mirror EM. By placing the entrance slit EN and the image therein a distance equal to the principal focal length of the concave Ebert mirror, the rays reflected by this mirror will be parallel at $PB_1$. This parallel beam $PB_1$ will be incident upon the ruled surface of a reflecting diffraction grating DG (which has vertically extending grating rulings and is mounted for rotation about a vertical grating axis GA).

As is well known, the beam incident on the difffraction grating will, after reflection thereby, be dispersed into its component wavelengths. In particular the reflected radiation will form an array of beams leaving the grating at different reflection angles for each wavelength, but each such monochromatic beam will consist of parallel rays. One such monochromatic beam made up of parallel dispersed radiation is indicated at $PD_1$. Upon striking the Ebert mirror for the second time, each of the parallel dispersed beams, including the beam $PD_1$, will be converged by the mirror so as to form a series of converging dispersed radiation beams. Thus one particular parallel but dispersed beam $PD_1$ will after reflection form the converging dispersed beam $CD_1$. If the Ebert monochromator is intended to be used in a single pass mode, mirror 10 will not be present; and this converging dispersed radiation at $CD_1$ would be allowed to come to a focus at the exit slit EX. The exit slit will allow only this particular beam of monochromatic light to pass to a further collimating mirror CM', which in turn will render the monochromatic light parallel at PM. As is well known in the spectroscopy art, such a parallel or collimated monochromatic radiant beam may then be introduced into a sample compartment SC (which may include both saample cell and a reference cell), the transmitted radiation therefrom at TR being measured, for example, by automatic photoelectric means.

In such a single-pass Ebert monochromator the exit slit EX will be at the principal focal point of the Ebert mirror EM, so that the converging dispersed beam $CD_1$ will be imaged in the slit plane. Since the parallel dispersed beam $PD_1$ indicated is the direction taken by only one particular wavelength of radiation (all other wavelengths leaving the diffraction grating DG at different angles), the converged dispersed beams for other wavelengths will make an angle with the particular converging dispersed beam $CB_1$ shown, so as to be focused in the plane of the exit slit at points other than its opening. In other words such different wavelength radiation will in general not be passed by the opening in the exit slit. As is now well known, the entrance and exit slits of an Ebert monochromator should preferably be formed as arcs of the same circle having its center on the optical axis (i.e., the vertical midline in FIG. 1) of the monochromator. As the diffraction grating DG is rotated about its axis GA, successively different wavelengths of radiation will be reflected by the grating along the line indicated at $PD_1$ (so as to be converged to a beam having its central axis along the line $CD_1$ and therefore pass through the opening in the exit slit EX). Thus rotation of the grating about its axis will cause different wavelengths of substantially monochromatic light to leave the exit slit, as is well known.

Figure 2:
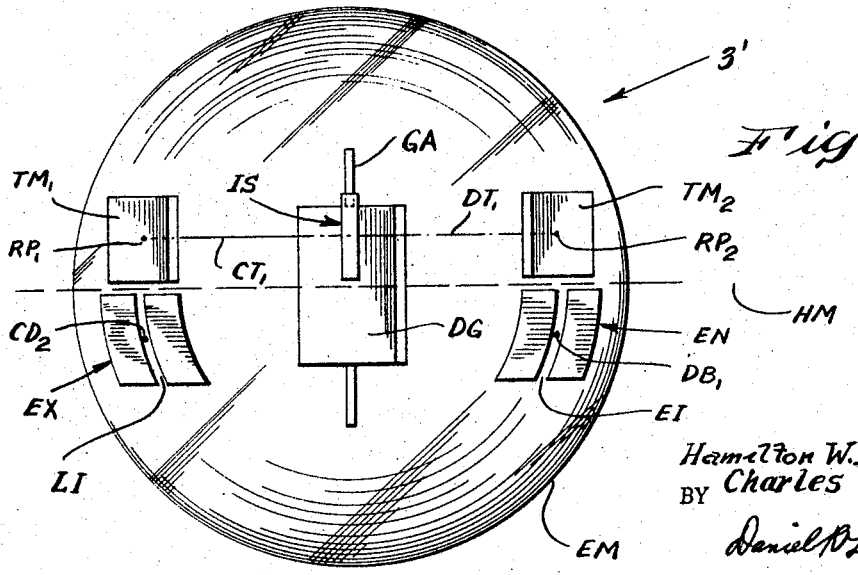
FIG. 2 is an enlarged elevation view of the apparatus in FIG. 1, taken along the lines 2—2.

The Ebert monochromator shown in FIGS. 1 and 2 is actually a double-pass monochromator and therefore has in addition to the elements just described a pair of tilted transfer mirrors $TM_1$ and $TM_2$. These mirrors cause the dispersed radiation to make a second pass through the monochromator in a manner quite similar to but also somewhat different from the manner of the first pass. Specifically the transfer mirrors $TM_1$ and $TM_2$ in the illustrated double-pass Ebert monochromator are both located above the central horizontal midplane HM passing through the optical axis, as may best be seen in FIG. 2. Both the entrance and the exit slits are completely below the same horizontal center plane, and may be considered the lower halves of longer arcuate slits centered on this horizontal center plane HM. Because of the fact that both the entrance and the exit slits are wholly below and the transfer mirrors are wholly above this horizontal center plane, both of the transfer mirrors $TM_1$, $TM_2$ are not skewed relative to the optical axis, but rather are at a single 45° angle thereto. In other words the front plane reflecting surfaces of these transfer mirrors make a 45° angle to both horizontal planes (i.e., planes parallel to the horizontal midplane HM viewed on edge in FIG. 2) and vertical planes (i.e., planes parallel to the vertical plane perpendicular to the paper and through the optical axis OA in FIG. 1). Stated in other terms, the reflecting plane surfaces of the transfer mirrors are parallel to the lines of the grating (which extend exactly vertically in FIG. 2 and exactly perpendicular to the plane of the paper in FIG. 1).

The manner in which the radiation makes two passes through the monochromator can best be seen from a comparison of FIGS. 1 and 2 with FIG. 3. FIG. 3 is almost a side elevation (looking from the right generally along the lines 3—3 in FIG. 1). However, to better distinguish the various elements that are in substantially the same horizontal plane, the view in FIG. 3 is taken somewhat above the horizontal center plane of the monochromator, with the observer also a little bit to the right of most of the elements in FIG. 3. In other words, the observer is looking generally along the direction indicated by the arrow 3' in FIGS. 1 and 2.

Comparing FIG. 3 to the already described parts of FIG. 1, it is seen that the converging radiation from the imaging mirror IM (in FIG. 1) is at the lower left-hand corner of FIG. 3 and comes to a focus at the entrance image EI. The diverging beam DB from this image (formed in the aperture of the arcuate entranse slit EN) passes below the right-hand transfer mirror $TM_2$ and eventually reaches the Ebert mirror EM as a continuing, diverging beam $DB_1$. As previously described, the collimated beam resulting after reflection from the concave Ebert miror will travel in the direction indicated at $PB_1$ so as to strike the diffraction grating's surface as parallel rays. It should be noted that the diverging beam $DB_1$, although parallel to the optical axis OA of the Ebert mirror, is both to the right (see FIG. 1) and below (see FIG. 2) this axis. Thus the beam $DB_1$ strikes a part of the Ebert mirror at which the normal to the surface NS makes an angle to the optical axis in both the horizontal plane (as best seen in FIG. 1) and the vertical plane. For this reason the reflected parallel beam $PB_1$ is at an angle to the optical axis as measured in both the horizontal (see FIG. 1) and the vertical planes. Because the diffraction grating DB (in which the grating lines are vertical) acts as a plane mirror as to the direction of incident and reflected rays relative to the horizontal plane, the well-known law of reflection applies as to angles relative to the horizontal plane. Since the incident parallel beam $PB_1$ makes an angle to the horizontal plane, the reflected parallel dispersed radiation at $PD_1$ will therefore make the same angle with the horizontal plane.

As is well known, the diffraction grating does not act as a plane mirror as to the angles of incidence and reflection (actually, diffraction) when measured relative to the vertical plane (for vertically extending grating lines). In fact the angle of diffraction is a function not only of the grating form and geometry, but also of the wavelength of the radiation (this of course being the underlying reason for the dispersion caused by the grating). Therefore the angle that the parallel dispersed beam $PD_1$ (leaving the grating) makes with the vertical plane (i.e., the angle best seen in FIG. 1) depends on the wavelength of the monochromatic radiation making up this particular beam. Thus, as stated earlier, the beam $PD_1$ actually represents only one of the monochromatic collimated beams leaving the grating. It is again noted that all such beams (regardless of wavelength) will make the same angle with a horizontal plane (such as the horizontal midplane HM in FIG. 2). Therefore not only the central ray of the particular dispersed parallel beam $PD_1$ but also the central rays of all such beams for the various wavelengths will strike the surface of the Ebert monochromator, not only at the same angle relative to the horizontal plane, but also at substantially the same "height" above the optical axis of the monochromator. Because of the symmetry conditions existing, the resulting converging dispersed beam $CD_1$ will be parallel to the original entering beam $DB_1$ (as measured by their central rays), both being horizontal (i.e., parallel to the horizontal midplane HM through the optical axis, although on opposite sides of this plane). In fact all the first pass converging dispersed radiation beams (like $CD_1$) will be parallel to the horizontal plane, regardless of their wavelength.

As previously stated, it is assumed that the particular converging dispersed beam $CD_1$ shown is the one that would in a single pass monochromator be imaged in the exit slit (i.e., be at the wavelength for which the particular angular setting of the diffraction grating would cause this wavelength to pass through the monochromator exit slit if not interrupted). In the actual double-pass monochromator shown, however, the first transfer mirror $TM_1$ intercepts this beam and reflects it at a 90° angle (see FIG. 1) relative to its original direction (because the transfer mirror is at a 45° angle). After such reflection the converging transferred first beam $CT_1$ will proceed to the right as viewed in FIGS. 1 and 2. Because of the converging nature of this radiation, an intermediate image II will be formed at the location best seen in FIG. 1. Specifically this image will be a reimaging of the entrance image EI (which in turn is an image of the original light source LS), but will of course consist solely of substantially monochromatic light. Obviously the position of this intermediate image II will be the same distance to the right of the reflection point $RP_1$ of the transfer mirror, as the exit slit EX (and therefore the normal single pass final image) is behind this point $RP_1$. In fact the intermediate image II corresponds in every way except as to its 90° different orientation and its actual position to the final image of a single-pass monochromator. Because of the fact that the entrance slit EN is wholly below the horizontal midplane of the monochromator, this intermediate image is wholly above this midplane (as may be best gathered from FIG. 3). For this reason, a single-pass version of the actual monochromator shown would have its single-pass exit slit directly in line with the transfer mirror $TM_1$ (i.e., in FIG. 2, at the same height as but closer to the observer than mirror $TM_1$); of course such a single-pass monochromator would not actually have the mirrors $TM_1$ and $TM_2$ at all.

In the actual double-pass embodiment, the monochromatic radiation after being focused to an image at II will diverge therefrom as a diverging transferred beam $DT_1$, which reaches and is reflected by a second angled transfer mirror $TM_2$ at reflection point $RP_2$. After reflection the diverging light will form a second-pass diverging beam at $DB_2$ (as best seen in FIG. 3). As may best be seen by comparison of FIGS. 1 and 3, this second pass diverging beam $DB_2$ is parallel to and directly above the original diverging beam $DB_1$ from the entrance slit EN. The optical path from the intermediate image II along beam $DT_1$ and then along beam $DB_2$ to the surface of the Ebert mirror will be the same in length as the optical distance from the entrance image EI along beam DB and $DB_1$ to this mirror. In fact the second pass diverging beam $DB_2$ is essentially identical in every respect to the original diverging beam $DB_1$ except for the following two differences: The second-pass beam $DB_2$ will be as much above the horizontal midplane of the monochromator as the original beam $DB_1$ is below this plane, and the second-pass beam $DB_2$ is already composed of substantially monochromatic radiation. For this reason, the second-pass collimated beam $PB_2$ will be directly above the first-pass collimated or parallel beam $PB_1$, as may best be seen by their apparent coincidence in the plan view of FIG. 1.

Thus the second-pass collimated beam $PB_2$ will impinge upon the diffraction grating DG at the same "horizontal" angle as the original parallel beam $PB_1$ (both these horizontal angles being measured solely in a horizontal plane). Stated in other words, beams $PB_1$ and $PB_2$ make the same angle relative to a vertical plane. For this reason the still parallel (i.e., collimated) but dispersed radiation on the second pass at $PD_2$ will leave the diffraction grating at the same angle, as measured solely in a horizontal plane, as the first pass parallel dispersed beam $PD_1$.

In general the second-pass beams will be in the same vertical plane as the corresponding first-pass beams, but will be positioned symmetrically on the opposite side of the horizontal midplane HM and will make a "vertical" angle to this horizontal midplane (i.e., as measured in a vertical plane) that is equal but in the opposite sense to the original beams. Thus for example, beam $PB_2$ will make the same "horizontal" angle with the vertical plane through the optical axis in FIG. 1 as does original beam $PB_1$, but will make a "vertical" angle with the horizontal midplane that is equal but opposite in sense to that made by the original beam $PB_1$ (as may be gathered from FIG. 3). Because of this symmetry the second-pass parallel beam $PB_2$ will strike the grating at least at the same "height" (in particular, at a point on the same central horizontal midplane HM). If the grating is centered on the optical axis (and not tilted above the horizontal midline HM), and the other elements arranged symmetrically around this optical axis as shown, the second-pass parallel beam $PB_2$ will in fact strike the grating at exactly the same point as did the original parallel beam $PB_1$ (namely on the grating midpoint MP).

Because of the aforementioned symmetrical relationship, the second-pass parallel dispersed beam $PD_2$ will be in the same vertical plane as the first-pass corresponding beam $PD_1$, but will "dive" relative to the horizontal midplane as it leaves the grating, rather than "climb" as does the first-pass dispersed beam $PD_1$ (see FIG. 3). This second-pass parallel dispersed beam $PD_2$ will then strike the left-hand side of the Ebert mirror (see FIG. 1) at a point below the horizontal midplane (see FIG. 3) at the same distance below the horizontal midplane as the corresponding first-pass central ray (of $PD_1$) struck the mirror above this horizontal midplane. This impingement point of the second-pass central ray of $PD_2$ on the Ebert mirror will also be at the same height as the Ebert mirror impinging point of the central ray of the originally entering (first-pass) diverging beam $DB_1$. Because of the symmetry of the various beams above and below the horizontal plane, this second-pass parallel dispersed beam $PD_2$ will make the same "vertical" angle with a horizontal plane as did the first-pass parallel beam (before dispersion), $PB_1$. Thus the beams of the same pass before and after dispersion are in the same vertical plane and make an equal (but opposite sense) vertical angle with the horizontal midplane (for example, $PB_2$ and $PD_2$). Since corresponding beams of different passes also have this same relationship, i.e., equal but opposite sense vertical angles (for example $PB_1$ and $PB_2$), it necessarily follows that the vertical angles of $PB_1$ and of $PD_2$ are equal. Similarly, the vertical angles of $PD_1$ and $PB_2$ are also identical (in fact, the common vertical angle of $PD_1$ and $PB_2$ is equal to, except for sense, the common vertical angle of $PB_1$ and $PD_2$.

Thus, because of the symmetry of the instrument parts and the various rays relative to the horizontal midplane (including the fact that the grating is exactly vertical), the finally emerging converging, doubly dispersed beam $CD_2$ is both parallel to (i.e., horizontal) and at the same distance below the horizontal midplane as the original entering diverging beam $DB_1$. In fact for the same reason, the second-pass entering diverging beam $DB_2$ and the almost exiting converging dispersed beam $CD_1$ are not only in the same horizontal plane with each other, but this horizontal plane is the same distance above the midplane as is the common horizontal plane of $DB_1$ and $CD_2$ therebelow. For this reason the second-pass or actual exit slit is located the same distance below the horizontal midplane (HM in FIG. 2), as is the entrance slit.

Although there is a substantial degree of symmetry of both the instrument and the various rays about the vertical plane to the optical axis as well, the fact that the diffraction grating DG actually disperses the light in both passes somewhat complicates the situation. However, since the various rays representing dispersed light (such as $PD_1$, $CD_1$, $PD_2$, and $CD_2$) all represent monochromatic light of the same wavelength, there will be symmetry relative to the vertical central planes of the optical axis for beams of radiation at this particular wavelength. Thus, if the first passed parallel beam $PB_1$ (which is not monochromatic) causes the dispersed radiation of a particular wavelength to leave the grating along the path $PD_1$, it necessarily follows that this same wavelength radiation when impinged upon the diffraction grating for the second time at $PB_2$ will necessarily leave along a path at $PD_2$ which makes the same "horizontal angle" with the vertical midplane as did the first pass diffracted ray $PD_1$. In other words, since the (horizontal) angles of dispersion of $PD_1$ and $PD_2$ are necessarily also equal to each other. Because the entrance and exit slits are also symmetrically arranged relative to the vertical plane through the optical axis (OA in FIG. 1), the monochromatic beam that will ultimately pass through the exit slit (which corresponds to the beam paths actually shown) will in both passes be symmetrically arranged about the vertical plane before and after dispersion (i.e., the incident and diffracted ray make an equal angle but opposite in sense relative to this plane). It should be noted however that the angle of incidence and angle of diffraction (conventionally measured to the grating normal) are not equal. In fact, the exact relationship is referred to hereinafter.

For analysis of the first pass radiation through the monochromator, the well-known grating equation (see, for example, Jenkins and White, Fundamentals of Optics (3rd edition), McGraw-Hill Book Co., Inc., New York, 1957, page 333 at Equation 17f) may be written in the form:

$$\lambda_0 = \frac{1}{m_0}(\sin i_0 + \sin r_0) \qquad (1a)$$

where:

$\lambda_0$ is the wavelength of the particular diffracted beam which will reach the first-pass exit slit of the monochromator (i.e., the wavelength of $PD_1$ and $CD_1$ in the above description for a particular grating position $GP_0$ as shown in FIG. 4);

$m_0$ is the nominal number of grating lines per unit length (say, per mm.);

$i_0$ is the angle of incidence of the incoming beam ($PB_1$ in FIG. 1) as shown in FIG. 4 (measured from the grating normal $N_0$ for grating position $GP_0$);

$r_0$ is the angle of diffraction of the reflected beam of the particular wavelenth $\lambda_0$ (i.e., $PD_1$ in FIG. 1), as shown in FIG. 4 (also measured from normal $N_0$).

It may be noted that both the original incident (parallel) beam $PB_1$ and the resulting diffracted beam $PD_1$ in FIG. 4 are on the same side of the normal $N_0$. This illustrative relationship has been chosen so as to distinguish between the diffraction occurring and normal specular reflection; such a geometric relationship is not unusual in actual use of "blazed" reflective diffraction gratings.

If the grating is rotated through a small angle about its axis to a new position, then for the same incoming beam direction (i.e., along $PB_1$), a different wavelength (i.e., not $\lambda_0$) will be diffracted along the original ray path $PD_1$, so as to reach the first pass exit slit. The radiation of the original wavelength, $\lambda_0$, will no longer emerge along ray path $PD_1$, but rather will be diffracted along a changed path, say, $PD_c$. Thus for a very small angular change, $\Delta$, (exaggerated in size in FIG. 4 for purposes of clarity), in the grating position (namely, to $GP_c$), the new angular relationship for this same wavelength is given by:

$$\lambda_0 = \frac{1}{m_0}(\sin i_c + \sin r_c) \qquad (2a)$$

where: $i_c$ is the changed angle of incidence, as measured from the same incident ray direction $PB_1$, but to the changed position of the grating normal $N_c$ as shown in FIG. 4; and $r_c$ is the new angle of diffraction, as measured from the changed position of the normal $N_c$ to the changed position of the diffracted beam (of wavelength $\lambda_0$), somewhat arbitrarily assumed to be along ray path $PD_c$.

Since the grating has moved through the very small angle $\Delta$, the normal thereto obviously has also rotated this same angle. It is therefore obvious from inspection of FIG. 4 that:

$$i_c = i_0 + \Delta \qquad (2b)$$

Similarly we may write:

$$r_c = r_0 + \Delta - \gamma \qquad (2c)$$

In this last equation the first two terms of the right-hand side (that is, $r_0 + \Delta$) merely relate the changed diffraction angle to the original one due to the change in position of the normal (i.e., indicate that the frame of reference has been rotated); and therefore $r_0 + \Delta$ is merely the angle of the original diffracted ray, $PD_1$ relative to the changed normal $N_c$. The third term on the right-hand side of Equation 2c namely, $\gamma$, gives the actual change in position (in fixed space) of the radiation of wavelength $\lambda_0$ caused by the different angle of incidence. Thus $\gamma$ is the angle (in fixed space) between the original position $PD_1$ and the changed position $PD_c$ of this same wavelength when the grating is rotated through the small angle $\Delta$.

Substituting Equation 2b into Equation 2a indicates (as is obvious from FIG. 4) that $i_c$ is greater than $i_0$, so that its sine is also larger. A comparison of Equations 2a and 1a shows that the terms in the parentheses (i.e., the respective sums of the two sines) must be equal, since the rest of the terms in these equations are identical. It therefore follows (since $\sin i_c > \sin i_0$) that $\sin r_c < \sin r_0$. Therefore we know that $r_c < r_0$. Thus $PD_c$ is actually on the side of $PD_1$ indicated in FIG. 4. We may also write:

$$r_0 + \Delta - \gamma < r_0 \tag{2d}$$

leading to:

$$\Delta - \gamma < 0 \tag{2e}$$

The inequality of (2d), just above, indicates that:

$$\gamma > \Delta \tag{2f}$$

In the last three equations above, it is assumed that $\gamma$ has the same sign (say, positive) as $\Delta$ when they are measured in the same direction from respectively $PD_1$ to $PD_c$ and $N_o$ to $N_c$ (say, clockwise). In other words, $\gamma$ is measured in the same (clockwise) direction as the grating angle change $\Delta$ occurs, as shown in FIG. 4.

Substituting the values given in Equations 2b and 2c into Equation 2a yields:

$$\lambda_0 = \frac{1}{m_0}(\sin(i_0+\Delta)+\sin(r_0+\Delta-\gamma)) \tag{2g}$$

Let us assume that the grating has in addition to the nominal number of lines per unit length (that is, $m_0$) a periodic error in grating line spacing such that each unit length of the grating at least acts as if it has more or less lines than it theoretically should. Specifically, we shall assume that there are $m_0$ lines per millimeter, and that the ruling engine has a drive screw that has a one millimeter pitch. Under such circumstances any periodic error (caused by imperfections in the drive screw) will effectively cause an integral number of lines to be added or missing each millimeter. In other words, each millimeter of the grating will act as if it has $m_0 \pm k$ lines, where $k$ is a (quite small) integer representing the periodic grating error (and of course would be zero for a perfect grating). Although for purposes of simplicity and convenience it is assumed that the pitch of the grating engine screw is one millimeter so that $k$ is necessarily an integer when $m_0$ is expressed in lines per millimeter, the following can readily be generalized by recognizing that $k$ is merely the effective "incorrect" number of lines per unit length caused by imperfections in a screw. Thus, if the ruling engine screw had a pitch of three-quarters of a millimeter so that errors recurred in the grating at this linear interval, $k$ would then assume values of 0, 4/3, 8/3, 12/3, etc., if $m_0$ is still expressed in lines per millimeter.

If we now include the effects of such periodic errors, we may rewrite Equation 2g in the more general form:

$$\lambda_0 = \frac{1}{m_0 \pm k}(\sin(i_0+\Delta)+\sin(r_0+\Delta+\delta_k)) \tag{3a}$$

In Equation 3a the first term on the right-hand side includes the previously mentioned term $k$ so as to give the equation all possible values including the relatively low frequency errors ($k$ then being a small integer) which caused the so-called Rowland ghosts. The last term of the equation is generalized to indicate that the angle of diffraction for the same wavelength radiation will have a different value if $k$ is not zero, and in fact will assume a series of values for different $k$'s. Thus for $k=0$ (a perfect grating), $\delta_k$ will be the same as the $-\gamma$ of Equation 2g, but will assume different values for each low frequency periodic error in the grating. It will therefore indicate the angle at which the various Rowland ghosts will be formed relative to the fixed exit slit direction, namely, ray $PD_1$.

One ray including the effect of such grating error is shown at $PD_k$ in FIG. 4. It is indicated as being on the side of $PD_1$ opposite to that of $PD_c$, which would now represent the main or parent line diffraction direction of $\lambda_0$ wavelength radiation for the $\Delta$ change in grating position. Even though the wavelength and the term, $\sin(i_0+\Delta)$, are the same in both Equations 2g and 3a), nevertheless, the presence of the $\pm k$ term in the latter equation makes it possible for the Equation 3a term, $\sin(r_0+\Delta+\delta_k)$, not only to be either larger or smaller than the Equation 2g term, $\sin(r_0+\Delta-\gamma)$, but it may even be larger or smaller than the original Equation 1a term, $\sin r_0$, corresponding to no angular displacement of the grating. Since $\Delta$ is assumed to be very small, this merely means that a ghost of a particular wavelength $\lambda_0$ may appear in the exit slit either before or after the true (parent) dispersed radiation line of that wavelength has been moved past the slit due to the normal grating rotation. In FIG. 4, $PD_k$ represents a ghost line (of $\lambda_0$ wavelength radiation) that has not reached the exit slit (direction of ray $PD_1$) despite the fact that the grating has already been rotated (by small angle $\Delta$) beyond the point that the true parent line has already moved out of the exit slit (i.e., from along path $PD_1$ to along path $PD_c$).

We may change the form of Equation 3a by using the trigonometric identity, $$\sin(a+b) = \cos b \sin a + \cos a \sin b$$

We also note that if $\Delta$ is very small, then $\gamma$ is also necessarily small, and further if $k$ is very small in comparison with $m_0$, $\delta_k$ will be only slightly different from $-\gamma$ and therefore itself very small. Therefore we may replace the sine of the small angles $\Delta$ and $\delta_k$ with the angles themselves, and replace the cosine of these same angles with 1. We may therefore rewrite Equation 3a as:

$$(m_0 \pm k)\lambda_0 = \sin i_0 + \Delta \cos i_0 + \sin r_0 + \Delta \cos r_0 + \delta_k \cos r_0 \tag{3b}$$

We may rewrite Equation 1a in similar form:

$$m_0\lambda_0 = \sin i_0 + \sin r_0 \tag{3c}$$

Subtracting Equation 3c from Equation 3b yields:

$$\pm k\lambda_0 = \Delta(\cos i_0 + \cos r_0) + \delta_k \cos r_0 \tag{4a}$$

Since, as previously pointed out, $k$ is the number of incorrect lines per cycle of the ruling engine drive screw (i.e., may have small integral values), setting $k$ equal to 0 in Equation 4a gives the relation between $\delta_k$ (now merely $\delta_0$) and $\Delta$. Thus Equation 4a becomes for a perfect grating ($k=0$):

$$\Delta(\cos i_0 + \cos r_0) + \delta_0 \cos r_0 = 0 \tag{4b}$$

From Equation 4b it may be seen that for a perfect grating $\delta_0$ (which is the same $-\gamma$ in Equation 2d) will have the opposite sign of $\Delta$ if both are measured as indicated in FIG. 4. Equation 4b (as well as 2d) also applies to the main or parent line (i.e., the most intense spectral line, caused by the normal grating spacing), even when the grating is imperfect and there therefore are ghosts present.

Equation 4a gives the position of the Rowland ghosts as the applicable small integers (among 1, 2, 3, etc.) are substituted for $k$. The angular position of one such ghost is schematically indicated by ray path $PD_k$ in FIG. 4. The actual value of the indicated $\delta_k$ diagrammatically shown in this figure will depend on both the wavelength and the value of $k$ (i.e., the order of the Rowland ghost) in Equation 4a.

It should be remembered that the $\Delta$ is the small angle by which the grating position is "wrong" to pass the particular wavelength $\lambda_0$ to the first-pass exit slit (for a perfect grating). Thus, Equation 4a relates the spurious or ghost line direction, $\delta_k$ composed of radiation of $\lambda_0$ wavelength, to the angular deviation $\Delta$ of the grating from the "correct" grating position for which the main or parent line of the same wavelength $\lambda_0$ is passed to the (first-pass) exit slit (i.e., the position, namely, $GP_0$, at which a perfect grating would fill the (first-pass) exit slit with $\lambda_0$ radiation). The equation may be readily solved for a particular wavelength and a particular "order" of grating error or ghost (i.e., a particular value of $k$, such as 1, 2, 3, etc.), since once the entrance and exit slits are fixed in space and the various optical elements are chosen, another relationship between the angles $i_0$ and $r_0$ becomes established. Thus in the illustrated monochromator of FIGS. 1–3, if the grating normal is on the same side of (rather than between) rays $PB_1$ and $PD_1$ as shown in FIG. 4, we have the relationship that: $r_0 - i_0 = A$, the latter being the fixed included angle between the rays defining the entrance slit and exit slit directions, namely, $PB_1$ and $PD_1$ (see FIG. 4). Thus, for a given wavelength, $\lambda_0$, the just mentioned fixed value for the difference of the angles and the relationship of Equation 1a yield a particular value for $i_0$ and $r_0$. Either $i_0$ or $r_0$ may then be used to determine the position of the grating normal $N_0$ (and therefore the grating position $GP_0$ if desired). With $\lambda_0$, $i_0$, and $r_0$ now all fixed and known, Equation 4a directly relates the small change in grating position $\Delta$, which would cause the main or parent image of wavelength $\lambda_0$ to no longer be imaged at the exit slit, with the angular positions of the various possible ghosts (i.e., $k=1, 2, 3,$ etc.), composed of radiation of this wavelength. For the special condition, $\delta_k = 0$ (i.e., a ghost is diffracted directly at the first-pass exit slit), Equation 4a reduces to:

$$\pm k\lambda_0 = \Delta(\cos i_0 + \cos r_0) \quad (4c)$$

This gives directly the angular change $\Delta$ in the grating position from the "correct" one which will cause a particular "order" Rowland ghost ($k=1, 2, 3,$ etc.), to leave the grating directly along the exit slit path (i.e., $PD_1$) during the first pass through the monochromator. Such a ghost therefore will necessarily enter the monochromator on the second pass along line $PB_1$ (or more strictly speaking, $PB_2$ in the same vertical plane). Thus, for values of $\Delta$ and $k$ which satisfy Equation 4c a first-pass ghost composed of radiation of wavelength $\lambda_0$ will be incident on the grating of the second pass along ray path $PB_2$. As will be seen subsequently, however, this ghost (being composed of $\lambda_0$ wavelength radiation) still does not "match" the grating angle position (which is still "wrong" by the angle $\Delta$ for forming the main or parent line of $\lambda_0$ radiation at the second-pass exit slit). However, it is still possible that during the second-pass diffraction, the first-pass ghost will generate a second-pass ghost (i.e., a spurious second-pass line formed from a spuriously formed first-pass line) that is substantially along the second-pass exit slit direction $PD_2$. In fact, because of symmetry of ghost lines about the main or parent line and the general symmetry of the monochromator (including the substantial identity of first-pass and second-pass conditions and positions), it is expected that a second-pass ghost of a "centered" first-pass ghost will again be substantially "centered" (i.e., directed toward the exit slit) for each value of $k$, any integer. Fortunately, such ghosts of ghosts are necessarily of relatively low intensity relative to not only true parent lines but also even to ghosts caused by only a single pass.

For $\Delta = 0$ (i.e., the grating is at the "correct" position to pass the true parent line of $\lambda_0$ radiation to the (first-pass) exit slit, Equation 4a yields:

$$\pm k\lambda_0 = \delta_k \cos r_0 \quad (4d)$$

This gives the angle (from $PD_1$), $\delta_k$, of the first-pass ghosts of various "orders" ($k=1, 2, 3,$ etc.), composed of $\lambda_0$ radiation when the grating is set to pass this radiation $\lambda_0$ to the exit slit. This therefore yields information as to where these first-pass ghosts are actually formed at the intermediate image (II in FIGS. 1–3), which is of course in analogous optical position to the first-pass exit slit.

It may be mentioned that in all this discussion we assume that the different oders of the grating (which is of course entirely different from the different "orders" of ghost as we have defined and used the term here) do not normally cause any problems in a well designed monochromator, using only one or two of the lower numbered orders of diffraction: Thus Equation 1a may be more rigorously written as:

$$n\lambda_0 = \frac{1}{m_0}(\sin i_0 + \sin r_0) \quad (1b)$$

or:

$$nm_0\lambda_0 = \sin i_0 + \sin r_0 \quad (1c)$$

where $n$ is the order of the grating in which it is being used. Similarly Equation 3a may be written as:

$$n(m_0 \pm k)\lambda_0 = \sin(i_0 + \Delta) + \sin(r_0 + \Delta + \delta_k) \quad (3d)$$

If $m_0$ has very large values, such as:

$1,000 < m_0 < 20,000$ (which is always true for gratings used in the wavelength range of ultraviolet, visible and/or fairly near infrared), it is obvious that changes in the grating order $n$ have an entirely different effect than the changes in the grating ruling error $k$. For example, if $n$ changes from 3 to 4 (the smallest percentage change possible within the first few orders postulated as being used), $nm_0$ would change from, say, 3,000 to 4,000 (for $m_0 = 1,000$). If $k$ made a similar change (or any reasonably small change of value), for $n=3$, the value of $n(m_0 \pm k)$ would change merely from 3,009 and 2,991 (for $m_0+3$, $m_0-3$, respectively), to 3,012 and 2,988, respectively (for $m_0+4$, $m_0-4$). Obviously therefore the Rowland ghost positions (even for the first dozen or so "orders") involve positional changes in the diffracted radiation that are of an entirely different order of magnitude than grating order changes (i.e., changes in $n$). Therefore, we may reasonably neglect any interaction between a ghost and an actual grating order change, since the latter will cause extremely large angular displacements relative to the vary small changes of position of the Rowland ghost relative to the parent line.

Having now determined the angular position of the Rowland ghost after diffraction by the grating in the first pass through the monochromator, we now determine what the general conditions are for the radiation of this ghost to reach the exit slit on the second pass through the monochromator. Let us assume that this radiation on the second pass is incident on the grating at the "correct" angle to ultimately reach the exit slit after diffraction (i.e., is diffracted substantially along ray path $PD_1$ (or more strictly, $PD_2$), in FIG. 4). Assuming that the second-pass incident ray direction $PB_k$ (of arbitrarily shown position) will cause this, we shall define the angle between $PB_k$ and $PB_1$ as $\epsilon_k$. Since we have assumed the necessary incident path to cause the diffracted ray to emerge along the exit slit ray path $PD_1$, the diffracted and incident ray must satisfy the grating equation; thus $$\lambda_0(m_0 \pm k') = \sin(i_0' + \Delta - \epsilon_k) + \sin(r_0' + \Delta) \quad (5a)$$

In Equation 5a $k'$ has been used instead of $k$ (having substantially the same meaning) so as to indicate the possibility that different orders of ghosts (i.e., a different grating error) may be involved in the second pass from that of the first. The $\epsilon_k$ term therefore includes the case where only a second-pass ghost reaches the exit slit.

Equation 5a can be rewritten, in a manner analogus to the rewriting of Equation 3a as 3b, as:

$$\lambda_0(m_0 \pm k') = \sin i_0 + \Delta \cos i_0 - \epsilon_k \cos i_0 + \sin r_0 + \Delta \cos r_0 \quad (5b)$$

Subtracting Equation 1a from Equation 5b yields:

$$\pm k' \lambda_0 = \Delta(\cos i_0 + \cos r_0) - \epsilon_k (\cos i_0) \quad (6a)$$

If the grating is perfect (i.e., both the first-pass grating error term $k$ and the corresponding second-pass error term $k'$ are both zero), then Equation 4a and Equation 6a become, respectively:

$$\Delta(\cos i_0 + \cos r_0) + \delta_0 \cos r_0 = 0 \quad (4b)$$

and $$\Delta(\cos i_0 + \cos r_0) - \epsilon_0 \cos i_0 = 0 \quad (6b)$$

where $\delta_0$ has the same meaning as previously given, namely, the deviation angle of the first-pass diffracted beam (counterclockwise in FIG. 4) from the exit slit ray path $PB_1$ if the "perfect" grating is set a small angle $\Delta$ "wrong" to pass this wavelength $\lambda_0$ to the exit slit. The $\epsilon_0$ symbol denotes the incident angle deviation of that second-pass entering ray (clockwise in FIG. 4) from the regular entrance slit ray path $PB_2$ necessary to cause the perfect grating at the slightly "wrong" angular setting $\Delta$ to diffract the (true or parent line of the) radiation of this wavelength $\lambda_0$ to emerge along the exit slit path $PD_2$. Equating the left-hand terms of the last two equations and simplifying yields:

$$\delta_0 \cos r_0 = -\epsilon_0 \cos i_0 \quad (7a)$$

or, rewriting:

$$-\epsilon_0 = \frac{\cos r_0}{\cos i_0} \delta_0 \quad (7b)$$

If the double-pass monochromator is completely symmetrical, then the angle $\delta_x$ at which the first-pass diffracted ray (say, $PD_c$) of any particular wavelength $\lambda_x$ emerges relative to the first-pass exit slit direction (i.e., $PD_1$), determines the angle $\epsilon_x$ between the incident second-pass ray of this same wavelength and the entrance slit direction line or ray (i.e., $PB_2$, which is coincident in the horizontal plane with $PB_1$) so that these angles are equal, at least in absolute value. Thus, in such a symmetrical double-pass monochromator (as in the illustrated one of FIGS. 1–3) we may write generally:

$$|\epsilon_x| = |\delta_x| \quad (7c)$$

If the double-pass monochromator is designed to disperse the radiation in the same sense in both passes (i.e., in an additive fashion, rather than tending to recombine the first-pass dispersed radiation during the second pass) which of course is true not only of the illustrated monochromator but any practical double-pass (symmetrical) monochromator, then it is apparent that the minus sign in Equation 7b is meaningful. In other words, in such a correctly designed symmetrical double-pass monochromator, if the radiation of wavelenght $\lambda_x$ is dispersed at an angle $\delta_x$ from being directed toward the (first-pass) exit slit on the first pass, it will necessarily be on the "wrong" side of the central (entrance slit) incident direction to be directed to the exit slit on the second pass. In fact, it will be diffracted to miss the final exit slit by an angle greater than $\delta_x$ (or more specifically, approximately $2\delta_x$). Thus, since both cos $r_0$ and cos $i_0$ in Equation 7b have positive values (specifically, between 0 and 1, inclusive), this equation has no solution for the conditions stated: a symmetrical, correctly designed (i.e., not self-defeating) double-pass monochromator using a perfect grating. For such a monochromator, radiation dispersed away from the exit slit direction on the first pass will always be dispersed further from the exit slit direction on the second pass.

The only possible solution of Equation 7b under such ideal conditions is trivial (namely, $-\epsilon_0 = \delta_0 = 0$). This merely means that the radiation was not deviated from the exit slit direction by the first pass (since $\delta_0 = 0$), and therefore will not be so deviated in the second pass. In other words, the radiation, originally entering along $PB_1$ emerged (first pass) along $PD_1$, was therefore sent back along $PB_2$ and was diffracted the second time along $PD_1$ (really $PD_2$); this simply means that this radiation and the grating position are such (i.e., "matched") so that the grating equation was satisified in its simplest form (see Equation 1a). For radiation of the particular matching" wavelength $\lambda_0$, this of course means not only is $\delta_0 = 0$ as above, but also $\Delta = 0$ (which relation defines "matching" wavelength $\lambda_0$, this of course means not only Equation 1a.

Now that we know that the difference in signs of $\epsilon_k$ and $\delta_k$ in Equations 6a and 4a are not arbitrary, we consider these equations where the grating is not perfect (i.e., there are nonzero values of $k$ and/or $k'$). If $k' = 0$ (but $k \neq 0$), we will have the "parent" line (i.e., the main image corresponding to the dominant or nominal grating spacing) during the second pass of a particular first-pass ghost (i.e., a nonperfect first-pass image line). Therefore we may rewrite Equation 6a for $k' = 0$ (but $k \neq 0$), so that $\epsilon_k = \epsilon_0$ (but $\delta_k$ is different from $\delta_0$):

$$\epsilon_0 = \frac{\Delta(\cos i_0 + \cos r_0)}{\cos i_0} \quad (7d)$$

As previously noted, in the illustrated instrument and all completely symmetrical double-pass monochromators (i.e., the same dispersion element is used twice in exactly the same way), the second-pass incident angle relative to the central entrance ray $PB_2$ must be the same in absolute value as the first-pass diffracted emerging ray relative to the exit slit direction. Thus a first-pass ghost line, leaving the grating at a (first-pass) deviation angle $\delta_k$ from the exit slit direction $PD_1$, will necessarily start its second pass at an incidence deviation angle $\epsilon_0$ from the regular entrance slit direction $PB_2$ such that $\delta_k$ and $\epsilon_0$ are equal in absolute value. If measured from $PD_1$ and $PB_2$ in the same sense indicated for $\delta_k$ and $\epsilon_k$, respectively, in FIG. 4, $\delta_k$ and $\epsilon_0$ will have the same sign (and therefore be equal in algebraic value as well). Therefore, we may substitute $\epsilon_0$ for $\delta_k$ in Equation 4a:

$$\pm k\lambda_0 = \Delta(\cos i_0 + \cos r_0) + \epsilon_0 \cos r_0 \quad (8a)$$

From Equation 7d we note:

$$\Delta(\cos i_0 + \cos r_0) = \epsilon_0 \cos i_0 \quad (7e)$$

Substituting the right-hand term of Equation 7e for the left-hand term thereof in Equation 8a gives:

$$\pm k\lambda_0 = \epsilon_0 \cos i_0 + \epsilon_0 \cos r_0 \quad (8b)$$

$$= \epsilon_0 (\cos i_0 + \cos r_0) \quad (8c)$$

or:

$$\epsilon_0 = \frac{\pm k\lambda_0}{\cos i_0 + \cos r_0} \quad (9a)$$

As a check, we may note that for $\Delta = 0$ (i.e., the grating is set to pass $\lambda_0$ radiation as the true or parent line), Equation 8a reduces to:

$$\pm k\lambda_0 = \epsilon_0 \cos r_0 \quad (8e)$$

which is, as expected, merely another form of Equation 4d, previously developed and discussed.

Substitution of a zero value for $\Delta$ in Equation 7e so that $\epsilon_0 \cos i_0 = 0$ confirms that, in general, $\epsilon_0$ must be 0 if the grating position is set for (i.e., "matched" to) $\lambda_0$ (which is what $\Delta = 0$ means), and we are looking only at the second-pass true or parent line (i.e., $k'$ has already been assumed to be zero). In other words strong (parent) images of $\lambda_0$ wavelength radiation are diffracted in the second pass toward the final exit slit only if the radiation approaches the grating along ray path $PB_2$.

The next problem is what value of $\epsilon$ (incident deviation on second pass) will cause the first-pass parent line to be diffracted on the second pass so that a second-pass ghost thereof will pass through the final exit slit. Under these conditions, the first pass is assumed to involve no grating error (i.e., $k=0$), but the second pass causes true parent line radiation (which leaves the first pass at $\delta_0$ and therefore enters the second pass at the same angle) to form a second-pass ghost directed toward the exit slit. Thus $k'$ is not zero, $k=0$, and $\Delta$ is, in general, also not zero (since otherwise the first pass diffraction "error" $\delta_0$ would have been zero). From Equation 4a (with $k=0$), we obtained:

$$\delta_0 = \frac{-(\cos i_0 + r_0)\Delta}{\cos r_0} \qquad (10a)$$

or:

$$\Delta = \frac{-\cos r_0}{\cos i_0 + \cos r_0}\delta_0 \qquad (10b)$$

We rewrite Equation 6a in slightly rearranged form here for convenience:

$$\pm k'\lambda_0 = -\epsilon_k \cos i_0 + \Delta(\cos i_0 + \cos r_0) \qquad (11a)$$

Substituting the value of $\Delta$ as given in Equation 10b into Equation 11a gives:

$$\pm k'\lambda_0 = -\epsilon_k \cos i_0 + \frac{-\cos r_0 \delta_0}{\cos i_0 + \cos r_0}(\cos i_0 + \cos r_0) \qquad (12a)$$

Simplifying and substituting $\epsilon_k = \delta_0$ (which is always true) in this last equation gives:

$$\pm k'\lambda_0 = -\epsilon_k(\cos i_0 + \cos r_0) \qquad (13a)$$

This last equation may be transposed to:

$$\epsilon_k = -\frac{\pm k'\lambda_0}{\cos i_0 + \cos r_0} \qquad (14a)$$

As might be expected, a comparison of Equation 14a with Equation 9a indicates that the symmetry holds for ghosts as well as for "true" lines. Specifically the second-pass incident angle deviation $\epsilon_0$ for making a ghost generated in the first pass ($k \neq 0$) be imaged during the second pass as the main or true parent line (i.e., $k'=0$) is given by an expression (namely, Equation 9a) which is extremely similar to the value of the second-pass incident angle deviation $\epsilon_k$ for a true or parent first-pass line (i.e., $k=0$) to form, during the second pass, a ghost ($k'=0$) which passes through the final exit slit (i.e., Equation 14a). In fact, if the $\epsilon_0$ of the first situation (the second-pass true imaging of a first-pass generated ghost) represents a ghost for which $k=K$ (i.e., is the $K^{th}$ ghost in error "order"), a comparison of Equations 9a and 14a shows that for the analogous second situation (i.e., the second-pass generated ghost of a first-pass true or parent image), where the second-pass ghost is also of the same error "order" (i.e., $k'$ now also equals $K$):

$$|\epsilon_0| = |\epsilon_k| \qquad (14b)$$

In such similar ghost "order" situations, where a second-pass main image of a first-pass ghost of a particular "order" (i.e., $k=K$, $k'=0$) is compared with the analogous second-pass main image of a first-pass ghost ($k=0$, $k'=K$), combining Equations 9a and 14a actually gives:

$$\epsilon_0 = -\epsilon_k \qquad (14c)$$

This difference in sign in Equation 14c indicates that the deviation angle from central ray path $PB_2$ causing a first-pass ghost (of "order" such that $k=+K$) to be "perfectly" imaged (i.e., $k'=0$) in the final exit slit is on the opposite side of the central ray $PB_2$ from the deviation angle $-\epsilon_k$ of a first-pass main or "perfect" image (i.e., $k=0$) which has a same "order" ghost ($k'=+K$) imaged in the final exit slit. Thus the difference in sign in Equation 14c is not arbitrary but points out this physical difference in the sign of the deviation angle of second-pass incidence relative to the central ray $PB_2$ (i.e., the two deviation angles are on opposite sides of a central ray).

As a practical matter, however, ghosts are typically formed in symmetrical pairs about the main or "perfect" image regardless of which pass causes them. This is true because the ruling engine causes symmetrical errors in the grating, so that the grating will cause ghosts corresponding not only to, say, $m_0+K$ but also corresponding to $m_0-K$. For this reason a pair of first-pass ghosts will leave the grating symmetrically arranged on each side of the main image ray path. This main image ray path is of course determined by the particular angular setting of the grating on its axis. For example if the grating in FIG. 4 is at position $GP_c'$, the main image path for radiation of wavelength $\lambda_0$ will be $PD_c$. In addition to the ghost image path shown at $PD_k$, there will be a substantially symmetrically arranged ghost path on the other side of main path $PD_c$. For purposes of clarity in illustration this other ghost direction is not shown in FIG. 4. Rather we have simply chosen the one of this ghost pair which deviates from the first exit slit direction $PD_1$ by the lesser angle, so that on re-entry on the second pass (for example, along path $PB_k$) it deviates from the central ray corresponding to the entrance slit direction $PB_2$ by only a small angle, such as $\epsilon_k$.

We have determined the second-pass incidence deviation angle $\epsilon_0$ of a first-pass ghost of radiation (of wavelength $\lambda_0$) necessary for the second-pass diffraction to cause this ghost to be undesirably imaged in the final exit slit, as given by Equation 9a. Similarly we have found the value of the second-pass incident deviation angle, $\epsilon_k$ (from the first-pass main image of wavelength $\lambda_0$, when the grating is ont set to this wavelength) for which a second-pass ghost will be undesirably imaged in the final exit slit, as given by Equation 14a. As previously noted, these second-pass incident deviation angles are equal in absolute value, so that it is at least theoretically possible to eliminate both by somehow restricting the second-pass entrance angle of the monochromator so as to reject rays making such angles with the line representing the ideal second-pass entrance direction to the monochromator (i.e., the line $PB_2$). The invention so restricts the second-pass entrance angle by placing an auxiliary ghost-inhibiting intermediate slit IS at the intermediate image II (see FIGS. 1–3). This intermediate slit may suppress not only first-pass ghosts which would otherwise enter the grating during the second pass at such angles to be diffracted into the exit slit, but also first-pass main images (although not of the wavelength for which the grating is then set) which would otherwise enter the grating at deviation angles such that their second-pass ghosts would fall within the exit slit.

The half-width of the intermediate slit (the opening of which is of course centered about the curved intermediate image) should be so chosen that the just-mentioned undesirable rays are eliminated before the second-pass entry into the monochromator, without at all restricting the intensity of the radiation for which the monochromator is actually set. If the focal length of the Ebert mirror is F, the half width of the slit $S/2$ must be less than $\epsilon_0 F$ to eliminate the troublesome first-pass ghosts, and of course the numerically equal value of $\epsilon_k F$ to eliminate unwanted wavelengths which may form second-pass ghosts in the exit slit. Thus we may write:

$$S/2 < F|\epsilon_0| \qquad (15a)$$

and:

$$S/2 < F|\epsilon_k| \qquad (15b)$$

Substituting for the last term of these last two equations the values given, respectively, by Equation 9a and Equation 14a, they may be written as a single equation, thusly:

$$S/2 < |k''|\frac{\lambda_0 F}{\cos i_0 + \cos r_0} \qquad (15c)$$

where $k''$ can correspond to either $k$ or $k'$.

Obviously the intermediate slit, IS, will be centered on the intermediate optical axis defined by CT and DT (see FIG. 1), so as to have the same half-width on each side thereof. Thus, one opaque slit edge or jaw of the slit will eliminate those ghosts on one side of the "true" or parent spectral line image (along ray path $CT_1$ essentially along the center line of slit IS), and the other slit jaw will eliminate the other (symmetrically occurring) ghosts on the other side of the centered true parent line image. For those ghosts closest to the parent line image (and terefore the most troublesome and difficult to eliminate), $k''=\pm 1$. Therefore to eliminate even these ghosts, the slit half-width should be less than the value of Equation 15c for $k''=\pm 1$, thusly:

$$S/2 < \frac{\lambda_0 F}{\cos i_0 + \cos r_0} \quad (15d)$$

or:

$$S < \frac{2F\lambda_0}{\cos i_0 + \cos r_0} \quad (15e)$$

where S is the full width of the centered slit IS.

We may substitute in Equation 15e the value of $\lambda_0$ given by Equation 1a, thusly:

$$S < \frac{2F(\sin i_0 + \sin r_0)}{m_0(\cos i_0 + \cos r_0)} \quad (16a)$$

Since $r_0 > i_0$ as may be seen from FIG. 4, $\sin r_0 > \sin i_0$, so that:

$$\sin r_0 + \sin i_0 > \sin i_0 + \sin i_0$$

or:

$$\sin i_0 + \sin r_0 > 2 \sin i_0 \quad (16b)$$

Since $r_0 > i_0$, $\cos r_0 < \cos i_0$, so that:

$$\cos r_0 + \cos i_0 < \cos i_0 + \cos i_0$$

or $$\cos i_0 + \cos r_0 < 2 \cos i_0 \quad (16c)$$

The reciprocals of inequality (16c) must therefore be related thusly:

$$\frac{1}{\cos i_0 + \cos r_0} > \frac{1}{2 \cos i_0} \quad (16d)$$

Since substitution of the smaller right-hand terms of inequalities (16b) and (16d) for the larger left-hand terms thereof in inequality (16a) can only make the right-hand term in (16a) smaller, we may write:

$$S' < \frac{2F(2 \sin i_0)}{m_0(2 \cos i_0)} \quad (16e)$$

or:

$$S' < \frac{2F}{m_0} \tan i_0 \quad (16f)$$

where S' is known to be smaller than the S required by (16a).

Thus inequality (16f) supplies a slit width, S', which is narrow enough (or more exactly somewhat narrower than necessary) to eliminate the ghost lines, once the monochromator focal length F and grating parameters ($m_0$, the lines per millimeter; and $i_0$, the incident angle for the grating angle setting for a typical wavelength, or, preferably, the smallest incidence angle actually used with the particular grating). As an actual numerical example, for an Ebert mirror having a focal length of 600 mm., a grating with 1440 lines per millimeter, and a minimum used angle of incidence of 30°:

$$S' < \frac{(2)(600)}{1440}\left(\frac{\sqrt{3}}{3}\right) \quad (17a)$$

or:

$$S' < \frac{\sqrt{3}}{360}$$

or:

$$S' < .481 \text{ mm.} \quad (17b)$$

or:

$$S' < 481 \text{ microns} \quad (17c)$$

Since for such a monochromator the final exit slit EX and the original entrance slit EN typically have (variable) slit widths of, say, from 10 to 200 microns, substantially none of the desired "true" or parent spectral line image radiation is obstructed by such a relatively wide intermediate slit. Thus, the intermediate slit may act as a (wide) first-pass exit slit and a (wide) second-pass entrance slit simultaneously to eliminate substantially all ghosts (and in particular the Rowland ghosts, which ghosts typically lie the closest to the "true" line) without either obstructing any of the desired "correct" radiation or requiring extreme precision in alignment. For example, when the regular entrance and exit slits EN and EX of the just mentioned example are set to their maximum width (200 microns), the nominal intermediate slit width may be, say, 340 microns, midway between the minimum width of 200 microns, which would limit some desired radiation, and the 480 microns, which is the maximum to eliminate all the ghosts. Such a nominal slit width may have an over 10% manufacturing tolerance (i.e., 340±40 microns) and an alignment error of a similar amount (±40 microns) and still perform perfectly. Specifically, the largest effective half-slit width would then be $$\frac{340+40}{2}+40 = 190+40 = 230 \text{ microns}$$

still less than the effective half-width of 480/2=240 microns necessary to eliminate the nearest ghost. On the other hand, the smallest effective slit half-width would be $$\frac{340-40}{2}-40 = 150-40 = 110 \text{ microns}$$

which is larger than the half-width (100 microns) of the limiting regular entrance and exit slits. Obviously, if the regular entrance and exit slits of this same exemplary monochromator have smaller maximum widths, even greater tolerances would be permissable in both the actual width and precision of centering of the intermediate slit without affecting the desired radiation.

Manufacturing and alignment tolerances of ±10% or ±40 microns each are relatively very large in optical slits. For example, a similar ±10% (±20 micron) tolerance in the size and position of the regular entrance and exit slits would cause a change in the effective half-width thereof from $$\left(\frac{200-20}{2}+20\right) = 130 \text{ microns}$$

a ±30% error. The above exemplary manufacturing and alignment tolerances of the intermediate slit (causing no loss of desired radiation and still complete suppression of the ghosts), therefore, are much larger than for conventional optical silts, thereby reducing both the cost of manufacturing and the difficulty of both initial alignment and maintenance.

The intermediate slit IS without affecting the desired radiation, thus acts both as an additional exit slit for the first-pass dispersed radiation (thereby eliminating substantially all first-pass ghost lines) and as an entrance slit for the second-pass incident beam (thereby limiting the entrance beam to only that relatively narrow wavelength range which surrounds, and of course includes, the final very narrow wavelength band which will be "correctly" passed by the final exit slit EX). This second-pass entrance slit effect suppresses most of the troubleesome second-pass ghosts, namely, those of adjacent (but different) wavelengths to those for which the grating angle is set, but which would otherwise be incident on the grating at such angle (near but different from that of $PB_2$) so as to be diffracted substantially along $PD_2$ and therefore reach the exit slit EX.

The invention thus provides a technique for eliminating, at least most of the possible ghosts which would reach the final exit slit in a double-pass grating monochromator, without noticeably reducing the intensity of the desired monochromatic radiation. Further, this is accomplished in a manner requiring only an extremely simple structural addition to the basic monochromator and relatively moderate precision in manufacture and alignment. The intermediate slit of the invention may be made adjustable in any conventional manner for use in grating monochromators in which different gratings are interchanged. If an extremely large wavelength range is covered, it is possible to "program" the intermediate slit so that it is automatically adjusted both according to grating position and at interchange of the gratings, in a manner analogous to that well known for programming the entrance and exit slits. Although normally a fixed intermediate slit will suffice, if such adjustment is used it also need be of only moderate precision. Thus the invention provides a simple effective technique for substantially eliminating all troublesome ghosts and has the additional advantages of little interference with the desired radiation, structural simplicity, relatively large manufacturing and alignment tolerances, and versatility.

We claim:

1. In a multipass monochromator of the type including a dispersive diffraction grating, means for introducing a radiant beam to said dispersive grating in a first pass including means for collimating diverging radiation prior to its incidence on said grating, means for converging the resulting first-pass collimated dispersed radiation from said grating, thereby forming an intermediate image composed of said first-pass dispersed radiation prior to its return to said dispersive grating, means for returning at least one wavelength range of the resulting first-pass dispersed radiation from said intermediate image back to said dispersive grating in a second pass in such a manner that said dispersive grating will redisperse said one wavelength range beam in a manner similar to said first pass of the original radiant beam, and final exit slit means for isolating, from the resulting second redispersed beam, radiation substantially solely in a final narrow wavelength band, the improvement comprising:

an intermediate slit means, positioned in the optical path of the first-pass dispersed radiation at said intermediate image to act simultaneously as a first-pass exit slit and a second-pass entrance slit, said intermediate slit being of such width and position as to eliminate from said first-pass dispersed radiation substantially all radiation outside the immediate wavelength neighborhood of said final narrow wavelength band, said intermediate slit means comprising means for defining an intermediate slit having a half width $S/2$ somewhat less than:

$$\frac{\lambda_0 E}{\cos i_0 + \cos r_0}$$

where: $\lambda_0$ is the wavelength of the narrow wavelength band radiation desired to be collected after the second-pass dispersion by said final exit slit means; $F$ is the focal length of said means for converging said first-pass collimated dispersed radiation; $i_0$ is the angle of incidence of the first-pass incident beam on the dispersive grating; and $r_0$ is the diffraction angle of the resulting first-pass dispersed radiation of wavelength $\lambda_0$;

whereby said intermediate slit means is sufficiently wide to pass essentially all of the desired $\lambda_0$ wavelength radiation, but is sufficiently narrow to exclude passage of both all troublesome ghosts caused by imperfections in the dispersive grating created during the first-pass dispersion and also substantially all radiation of different but similar wavelengths to $\lambda_0$ for which a ghost created during the second-pass dispersion would fall within said final exit slit means;

thereby eliminating from the radiation passed by said final exit slit means substantially all spurious ghost radiation which could otherwise reach the final exit slit means.

References Cited

UNITED STATES PATENTS

| | | |
|---|---|---|
| 2,698,410 | 12/1954 | Madsen et al. |
| 2,868,063 | 1/1959 | Weiss. |
| 2,922,331 | 1/1960 | Fastie et al. |
| 3,098,408 | 7/1963 | Cary _____ 350—271 X |

RONALD L. WIBERT, *Primary Examiner.*

F. L. EVANS, *Assistant Examiner.*

U.S. Cl. X.R.

356—101